United States Patent [19]

Humphrey et al.

[11] 3,869,582

[45] Mar. 4, 1975

[54] INTRABUILDING TELEPHONE SYSTEM

[75] Inventors: Marion L. Humphrey, Bellwood; Ernest A. Tugaudis, Mount Prospect, both of Ill.

[73] Assignee: Allstate Insurance Company, Northbrook, Ill.

[22] Filed: June 4, 1973

[21] Appl. No.: 366,391

[52] U.S. Cl. .................................... 179/98, 179/29

[51] Int. Cl. ............................................... H04q 1/14

[58] Field of Search ................................ 179/98, 29

[56] References Cited

OTHER PUBLICATIONS

Telephony, Sept. 23, 1974, page 27.

Telephony, Oct. 24, 1970, pages 19–21.

*Primary Examiner*—William C. Cooper

[57] ABSTRACT

An intrabuilding telephone wiring system for a building structure. A central control junction panel is located within the building and is provided with first and second junction arrays. Each junction of the first junction array is connected to a telephone line leading to the commercial telephone system located without the building. One or more remote distribution panels has third and fourth junction arrays. A plurality of wire link sets is connected between the second junction array and each of the third junction arrays, there being at least one wire link set between each of the remote distribution panels and the central control panels and constituting a permanent wiring connection between the central control panel and the remote panels. A telephone line connection is provided between each junction of the fourth junction arrays and a female telephone connection jack, respectively, each jack being located at a selected physical location within the building. A plurality of patching jumpers is located within the central control panel for connecting between the first and second junction arrays. Each of the patching jumpers is removably connected between one junction of the first junction array and one junction of the second junction array. Likewise, a plurality of patching jumpers is located within each remote distribution panel for connection between one junction of the third junction array and one junction of the fourth junction array. Changing of a telephone number from one telephone connection jack to another is thereby easily and rapidly effected by simply reconnecting the appropriate patching jumpers within the central control panel and necessary remote distribution panels.

6 Claims, 12 Drawing Figures

PATENTED MAR 4 1975 3,869,582

INTRABUILDING TELEPHONE SYSTEM

BACKGROUND OF THE INVENTION

This invention relates generally to an improved intra-building telephone wiring system which has great flexibility in changing telephone numbers from one location to another.

A persistent and increasingly burdensome problem associated with the telephone industry has been the general inconvenience and expense in moving a telephone from one location to another and maintain the same number. If a new connection or reconnection is necessary, a visit by a telephone company repairman is generally mandatory, with increasing labor and material costs, a connection or reconnection of a single telephone number has become extremely sensitive and increasingly complex with the advent of large high-rise buildings. As stated in the July 1972 "Station Connection Study" of the Executive Office of the President's Office of Telecommunications Policy, there are three general areas in which financing pressures on the telephone companies could be substantially alleviated. These are (1) revision of the present rate structure, (2) expensing a larger portion of station connection costs of the telephone user, and (3) cutting down on labor costs associated with station connection service by revising operation procedures.

Probably the most viable of the three suggestions of the "Station Connection Study" is the third in which the operating procedures of the telephone companies are completely revamped. An advantageous system would be one in which telephone personnel would not be required for connection or reconnection of a telephone number within a single commercial building.

It is therefore a primary objection of the present invention to provide a novel telephone connection system for use within a building wherein connection or reconnection of telephone numbers may be carried out rapidly (within a matter of minutes) and inexpensively and be compatible with the extant telephone system.

It is a further object of this invention to provide a system for connection or reconnection of a telephone number wherein no soldering, wire-wrap, or like procedure is necessary to effect electrical connection.

Another object of the present invention is to provide a versatile telephone connection system for a building which is readily adaptable to remodeling and or personnel relocation changes in the building without relocation of the telephone wiring system.

Other objects, advantages and features of the invention will become apparent from the following detailed description, taken in conjunction with the accompanying drawings, and in which drawing:

DETAILED DESCRIPTION OF THE INVENTION

Figure 2:
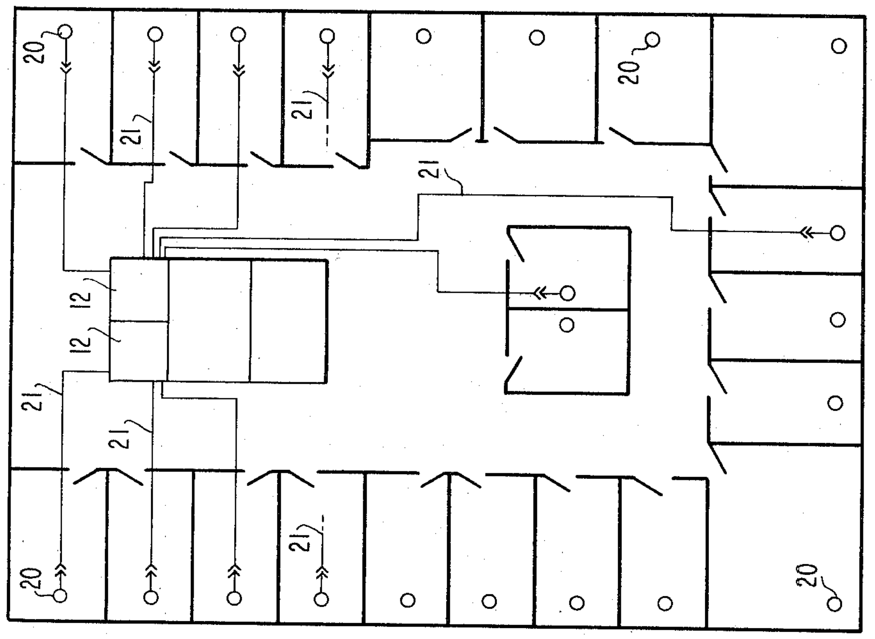
FIG. 2 is a diagrammatic view of a floor of the building of FIG. 1, showing the general manner of connection of the remote distribution panels with a plurality of telephone jacks.
Figure 1:
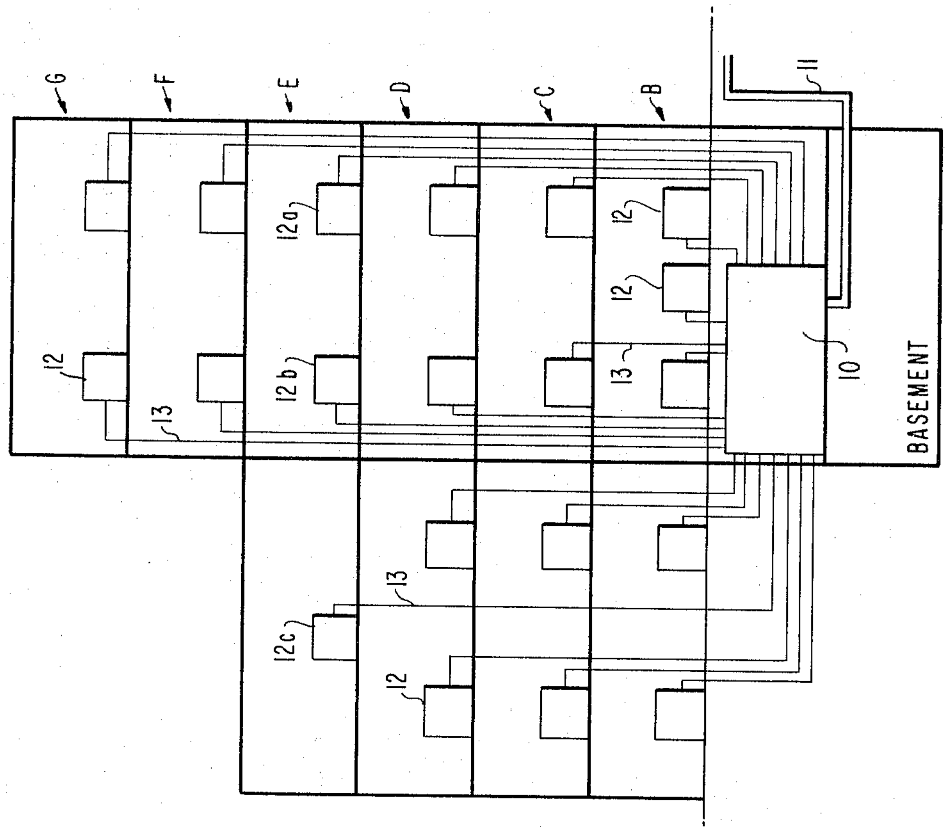
FIG. 1 is a diagrammatic view of a building showing a preferred embodiment of the invention including a central control panel, a plurality of remote distribution panels, and the connection therebetween.
Figure 7A:
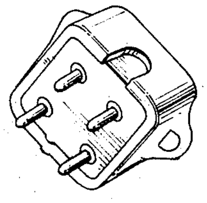
FIGS. 7*a* and 7*b* and FIGS. 8*a* and 8*b* show a telephone plug and jack receptacle respectively employed in the present invention.
Figure 7B:
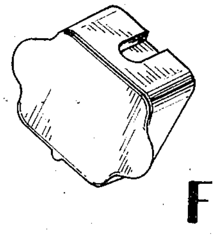
Figure 8B:
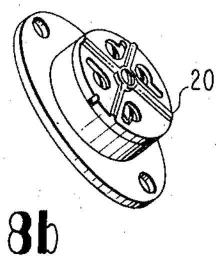
Figure 8A:
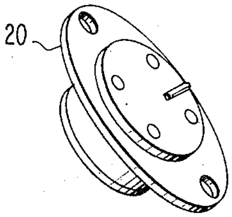

Referring now to the drawings, a building A, having floors B, C, D, E, F, and G, constituting the first through sixth floors of the building, respectively. In FIG. 1, Building A is provided with central control panel 10 in a utility area thereof, which may be in the "basement", first floor B or any other location in the building convienient to receive a plurality of incoming telephone lines 30 in cable 11. Telephone cable 11 enters the building and is connected to central control panel 10 in a manner described more fully hereinafter in connection with the description in FIG. 3. A plurality of remote distribution panels 12 are spaced throughout the building, each being separately connected to central control panel 10 by prewiring telephone lineset 13. As shown in FIG. 1, any number of remote distribution panels 12 may be located on a single floor as desired. For example, if floor G were desired to be a storage area and consequently have few or no telephone connections, the remote distribution panels for floor 12G could be eliminated and any necessary telephone connections be made to the panel on floor F. Also, if floor B were desired to be a telephone communication center, any number of remote distribution panels 12 could be located thereon for that purpose. In some cases it may be desirable to provide one remote distribution panel 12 to serve two or more floors. Thus, the number and location of remote distribution panels 12 is selected in accordance with the number and location of the telephones in such areas. Referring to FIG. 2, which could be a representation of any floor of building A which employs one or more remote distribution panels 12, two remote distribution panels 12 are centrally located in a utility area and are permanently connected to a plurality of conventional telephone jacks 20, each by a telephone line 21, as shown generally in FIGS. 8*a* and 8*b*, telephone jacks 20 are conventional receptacle telephone jacks. Obviously, the remote distribution panels 12 may be located at opposite ends of the floor or in a closet, etc. The connection of a telephone to jack 20 is effected by use of conventional 4-prong telephone plugs as shown in FIGS. 7*a* and 7*b*.

Figure 3:
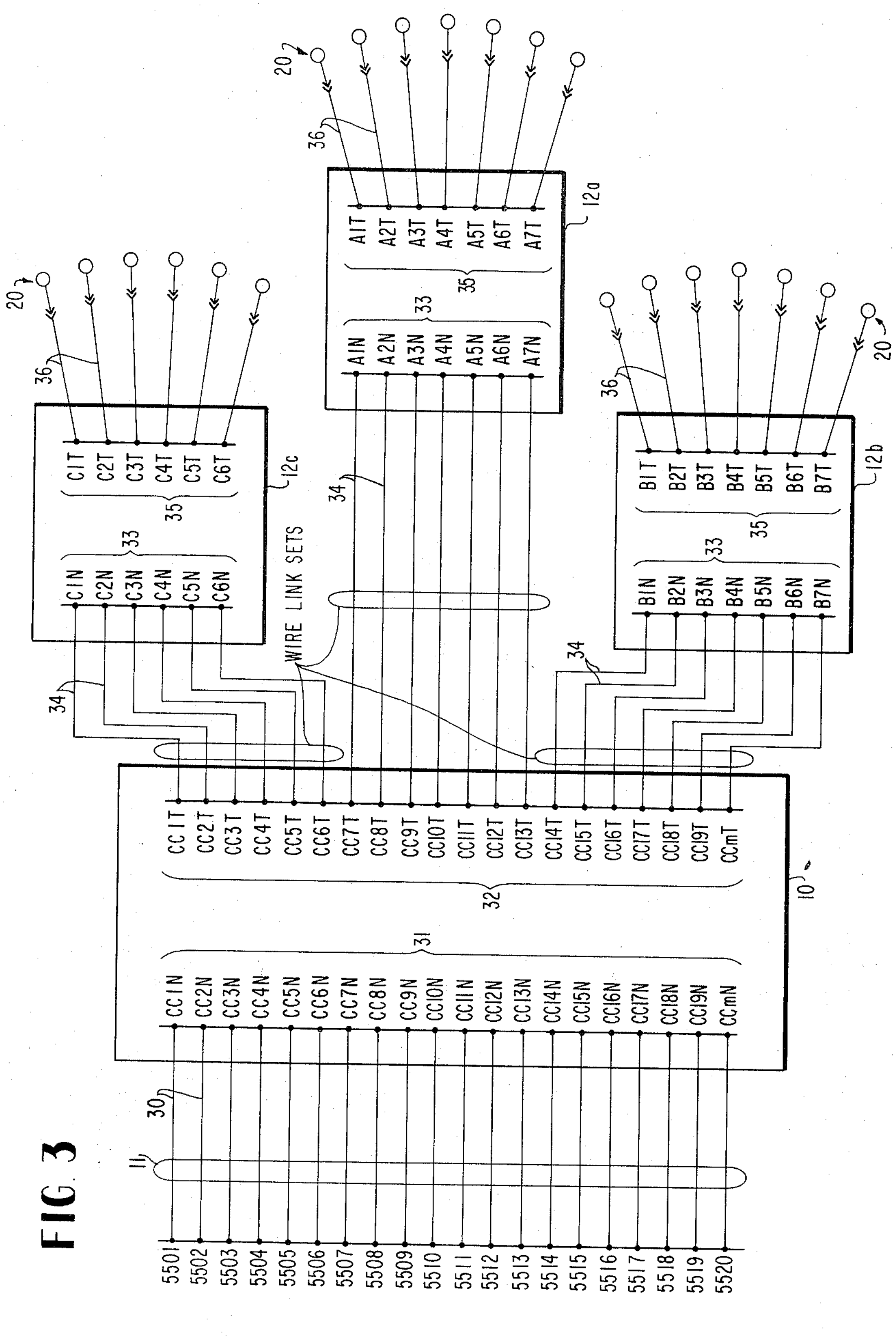
FIG. 3 is a schematic representation of a portion of the pre-wiring scheme of the present invention showing the inter-relation of the components thereof.

In FIG. 3, central control panel 10 is schematically shown connected to a plurality of remote distribution panels 12. This could depict connections between a remote distribution panel 12 of floor E of FIG. 1 and central control panel 10. The plurality of individual telephone lines 30 enter building A and are connected to junction ccln through CC20N in central control panel 10. It will be appreciated that although only twenty telephone lines (or numbers) are shown in FIG. 3, there normally would be many more. Each incoming telephone line or number is permanently connected to a separate one of junctions ccln through CC20N, respectively.

Figure 5A:
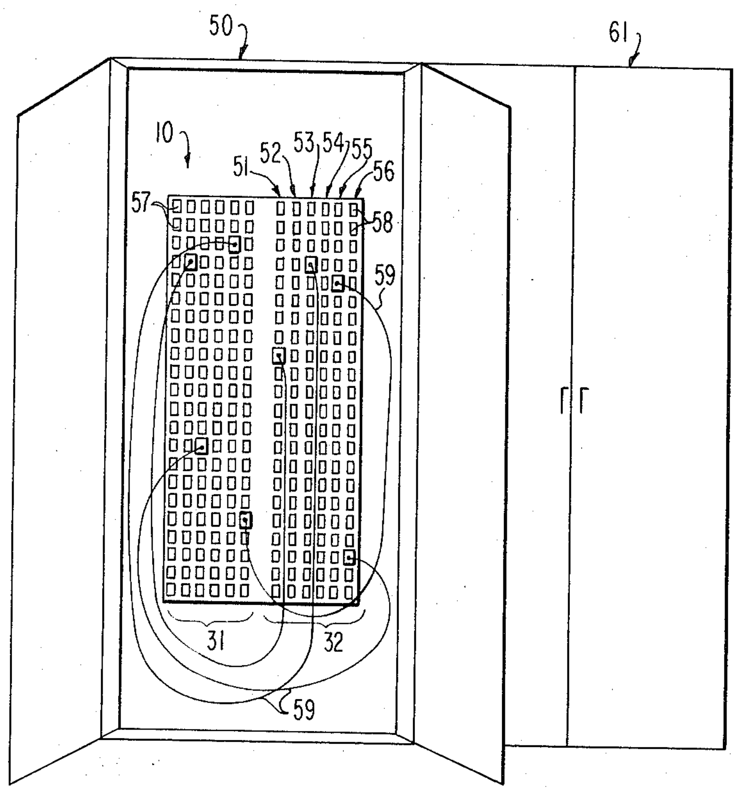
FIG. 5*a* depicts a connection panel employed in the present invention, showing a connection of a number of junctions therein.
Figures 5B, 5C:
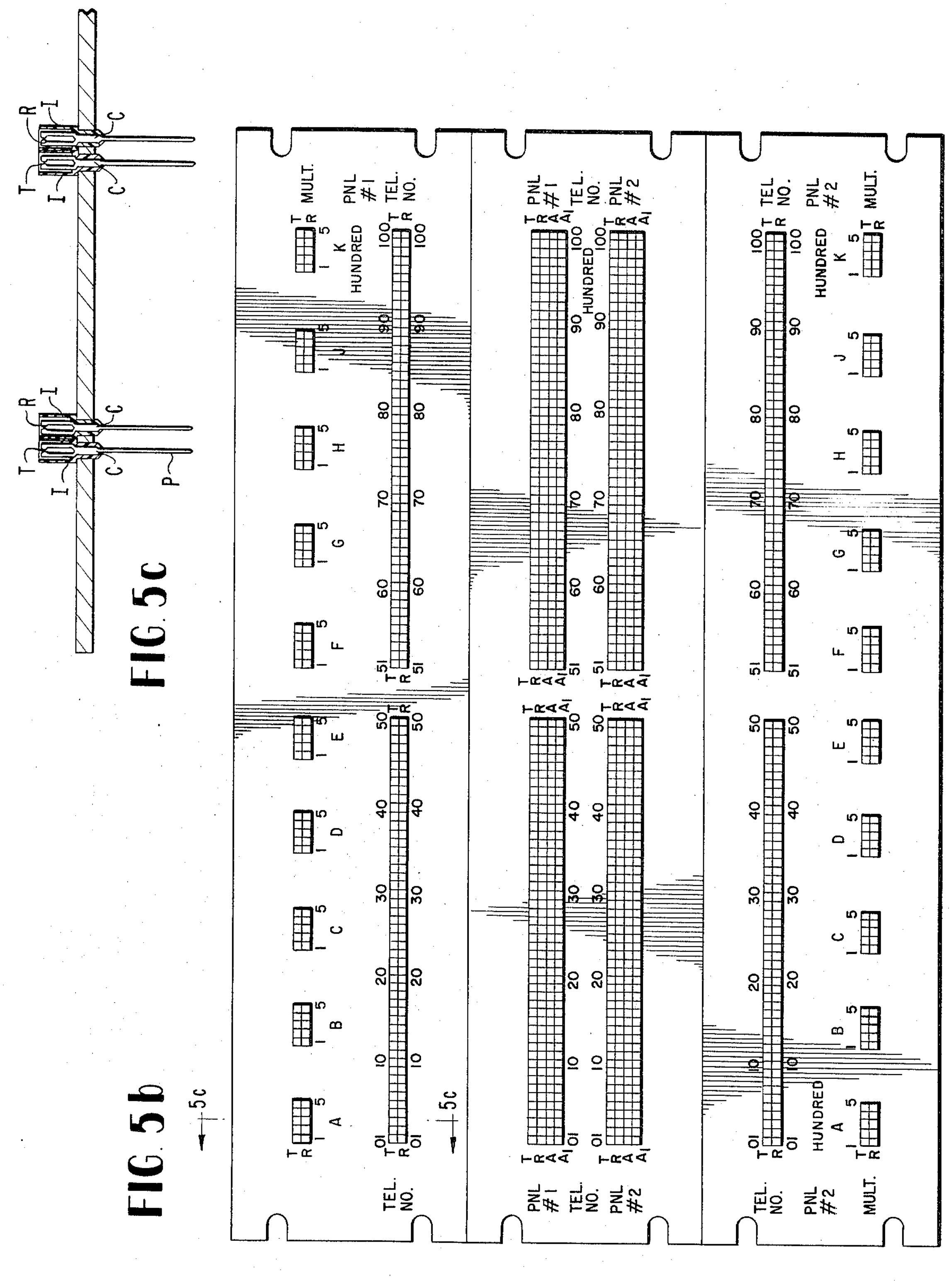
FIG. 5*b* shows a connection panel lay out and top plan view showing one number arrangement as well as the panel location of a multiple extension telephone junction (10 clusters per side shown)
FIG. 5*c* is a cross section taken on lines 5*c*—5*c* of FIG. 5*b*.

As shown in FIG. 5c, each junction telephone line or connector point is constituted by a standard connection pair, each constituted by an insulator element I and a conductor assembly C. Conductor assembly C has a long post element P to which permanent wire wrap type or solder circuit connections may be made. These are standard Amphenol brand connections and have been used extensively heretofore in making central office telephone connections (See "The Denver Plan — CCB A Method of Reducing Central Office Bulge" a publication by Amphenol Industrial Division of Bunker Ramo Corporation, incorporated herein, for a detailed disclosure of connectors which are suitable for use in this invention; it being understood that other conventional connectors may be used). Each junction pair may be designated "T" (for "tip") and "R" (for "Ring"). Moreover, additional auxiliary connectors $A_1$ and $A_2$ may be provided on a panel as shown in FIG. 5b. These additional connectors accomodate auxiliary leads for lights, solenoids etc. and it is not necessary that they be used, and they may be omitted if desired. In general, then, the number of connectors junctions per telephone line are sufficient to accommodate the telephone service associated with any telephone numbers. In FIG. 5b there is shown an auxiliary pair A1–A2 for each of the 100 members in "panel number 1" and each of the 100 numbers on "panel number 2". Central control panel 10 is provided with as many incoming junctions ccln through ccmn as necessary to separately connect each incoming telephone number to a separate junction. Junctions CClN through CCMN may be designated a first junction array 31.

Junctions CC1T through CCMT as shown in FIG. 3 represent a second junction array 32 each junction of which is identical to those in the first junction array. Each junction CC1T through CCIT is permanently connected (by wire wrap connections on post elements P) to junctions ann through mnn of remote distribution panels 12. As shown in FIG. 3, remote distribution panel 12a includes a third junction array 33 comprised of seven separate junctions aln through A7N. Likewise, remote distribution panel 12b includes third junction array 33 with seven junctions bin and B7N and third remote distribution panel 12c includes third junction array 33 and six junctions C1N through C6N. Each junction of third junction array 33 are permanently connected to a separate junction of second junction array 32 via telephone line 34 link link sets. Each "line" in a link set is composed of a wire pair where only the tip and ring connection is desired. Where the auxiliary terminal junctions are used a corresponding wire is provided to constitute the line.

Each remote distribution panel 12, 12b, 12c, also has a fourth junction array 35, each junction of array 35 permanently connected by telephone lines 36 to telephone jacks 20 which are spaced at discrete physical locations on walls or in floor boxes throughout the floor of the building on which they are located.

Figure 4:
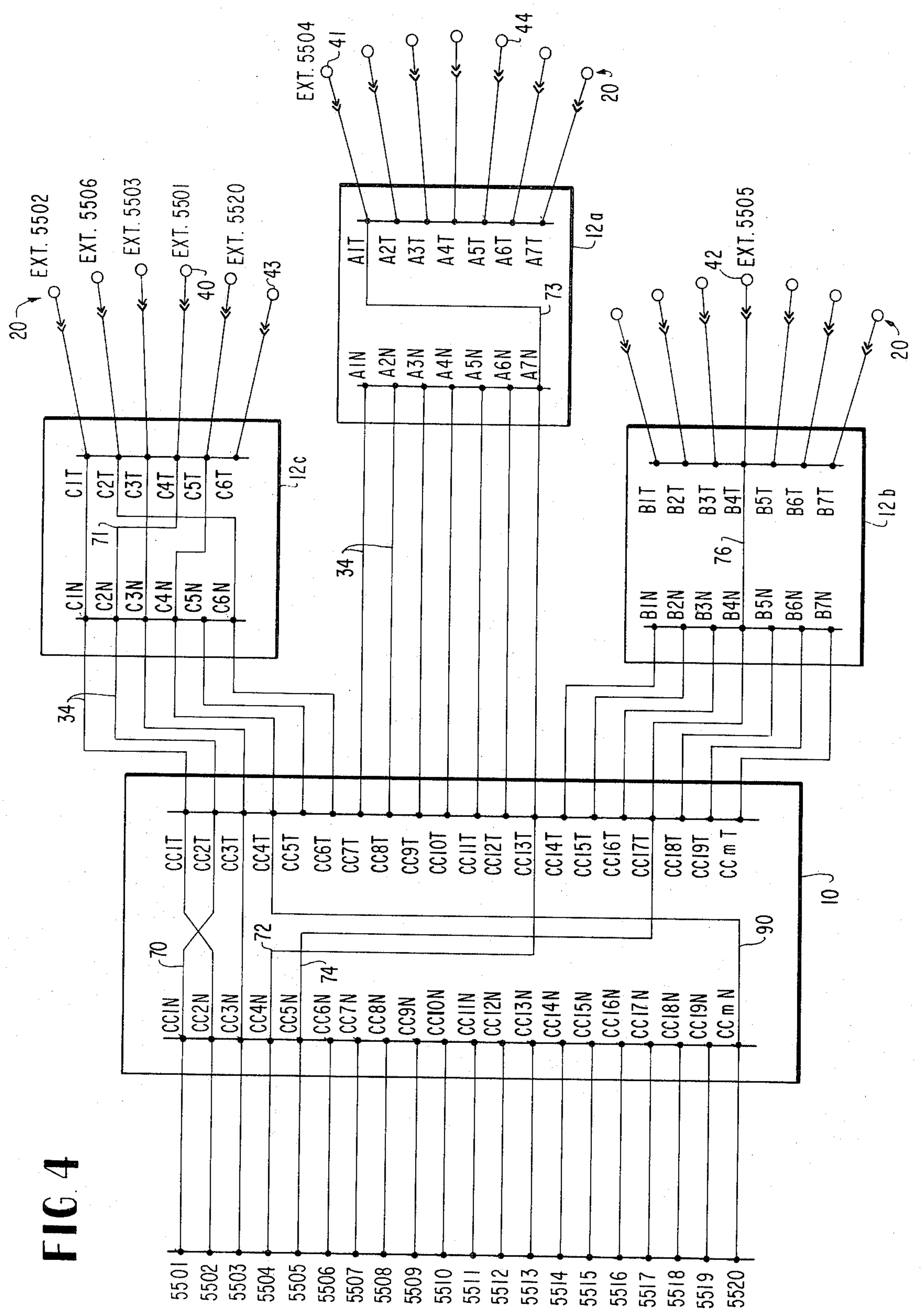
FIG. 4 is a schematic view similar to FIG. 3, representing a connection of a number of junctions within the central control panel and each remote distribution panel depicted therein.
Figure 6:
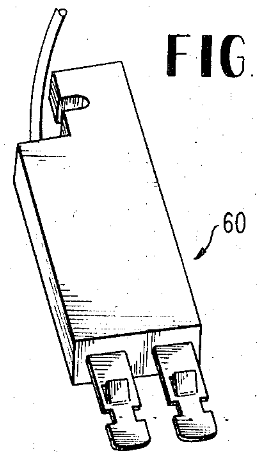
FIG. 6 shows a connector employed in the connection panel of FIG. 5.

FIG. 4 shows the same circuit plan as FIG. 3 schematically depicting the connection of a telephone number to a preselected telephone jack by means of the jumpers or patch cord elements (FIG. 6). For example, to connect telephone number 5501 to telephone jack 40, junction CC1N of first junction array 31 is connected by a patch cord set 70 to junction CC2T of second junction array 32 and junction C2N of the third junction array 33 is connected by patch cord set 71 to junction C4T a fourth junction array 35. Similarly, telephone number 5504 is connected to jack 41 by connecting, via patch cord set 72, junction CC4N of first junction array 31 with junction CC13T of second junction array 32 and connecting, via patch cord set 73, junction A7N of third junction array 33 with junction A1T of fourth junction array 35. In a like manner, telephone number 5505 is connected to telephone jack 42 by connecting, via path cord set 74, junction CC5N of first junction array 31 with junction CC17T of second array 32 and junction B4N of third junction array 33 via patch cord set 76 with junction B4T of fourth junction array 35. In a similar manner, as many telephone numbers as desired are connected to telephone jacks 20, respectively, by effecting electrical patch cord connections in building central control panel 10 and remote building distribution panels 12.

FIG. 5a depicts one embodiment of central control panel 10. Central control panel 10 is located within a cabinet 50 or similar structure, that is provided with first junction array 31 and second junction array 32. Each junction 57 of first junction array 31 (is constituted by a pair of connector terminals (FIG. 5c) is permanently connected to a telephone line 30, respectively, which is contained within telephone cable 11 (FIG. 1). Each junction 58 of second junction array 32 is permanently connected to a further connection located in third junction array 33 of remote distribution panels 12. Each column 51 through 56 of second junction array 32 corresponds to floors B through G of building A, respectively. Each junction of columns 51 through 56 is connected to a junction of third junction array 33 of each remote distribution panel 12 on the appropriate floor. To ease connection, each column 51 through 56 may be color-coded with a separate color.

Electrical connections between first junction array 31 and second junction array 32 are completed by employing patching jumpers 59. Preferably, each patching jumber 59 is of a sufficient length to extend between any junction 57 of first junction array 31 and any junction 58 of second junction array 32. Patching jumpers 59 may also be color-coded to ease connections. Each patching jumper 59 is terminated on each end by a two-prong plug 60. Patching jumpers 59 may be permanently affixed to junction 57 their free ends adaptable to be inserted within any junction 58. Also, patching jumper 59 need not be permanently connected to junctions 57 nor 58 but rather be adaptable to be accepted by any junction 57 or 58 and this may be preferred.

Remote distribution panels 12 are located on floors B through G of building A in cabinet (not shown) similar to cabinet 50. For floors with more than one remote distribution panel 12, additional cabinets are provided. As obvious, each remote distribution panel 12 would require far fewer junctions 57 and 58 than for central control panel. For example, the simplified remote distribution panel 12 of FIG. 4 require only six or seven such junctions. Therefore, only six or seven junctions 57 and six or seven junctions 58 would be provided as necessary.

As shown in FIG. 5*b*, the remote panels 12 are provided with multiple extension telephones which appear on one number. In the embodiment shown it is assumed that 10% of the numbers may be so used and space is provided for five extensions (1–5) the T and R terminals all of which are commonly connected together on the post extensions P. If more extensions are desired on a given number, an auxiliary patching operation between Group A and Group B on panel number 1 could be effected, it being understood that the remote telephone jacks and locations which are permanently connected (e.g. "Hard wired") thereto are then connected to one number.

Returning to FIG. 4, a telephone number is rapidly relocated from one telephone jack 20 to another in the following manner. To reconnect extension 5520 to telephone jack 43, the patching jumper connected to junction C5T is simply removed therefrom and connected to junction C6T. If extension 5520 were desired to be relocated at jack 44, the patching jumper connected to junction CC4T would be removed therefrom and connected to any available junction CC7T through CC13T, for example, see CC10T. A patching jumper would then be connected between junctions A4N and A5T to complete the relocation of extension 5520. In this manner, any telephone number can be located at any telephone jack 20 located anywhere within building A.

We have thus provided an intrabuilding telephone system which permits greater flexibility in changing telephones from one location to another within a Commercial building. The cost of moving a telephone from one location to another within a matter of minutes and maintaining the same number has been greatly reduced. This invention will permit complete groups of people to be moved from one location to another with a minimum amount of work disruption, because telephone service can be restored within a matter of minutes.

This invention greatly reduces the expenses of telephone moves as well as installation of new phones. The wire and phone plug is already located under the floor and only requires a phone to be plugged in and the appropriate connections to be made by the use of jumper plugs.

The intent of this invention is to also include this approach to single level buildings and structures connected to the main structure. Only a remote control panel 12 is required.

Various changes may be made to the forms of the invention herein shown and described without departing from the spirit of the invention or the scope of the following claims in which is claimed.

what is claimed is:

1. An intrabuilding telephone system for a building structure comprising in combination a central control panel within the building for connection to the commercial telephone system located external to the building, said central control panel having first and second junction arrays with each junction in said first array being connected to an incoming telephone line of said commercial telephone system, a plurality of remote distribution panels spaced throughout said building, each remote distribution panel provided with third and fourth junction arrays, a plurality of telephone connection jacks located at discrete physical locations throughout the building, a telephone line wiring connection between each telephone connection jack and a preselected junction of said fourth junction array, each of said telephone line wiring connections constituting a permanent electrical installation in said building, a plurality of wire link sets, there being at least one wire link set between each of said remote distribution panels and said central control panel, each wire link set being constituted by wire connection means connected between a selected group of junctions in said second array and corresponding junctions in said third array in said remote panels, respectively, said wire link sets constituting a permanent electrical wiring installation in said building, a first plurality of patching jumpers, each patching jumper including a telephone wire line and plugs at each end thereof, said plugs being receivable in said receptacles, located within said central panel, each of said patching jumpers and plugs forming a telephone line connection between one junction of said first junction array and one junction of said second junction array, and a plurality of further patching jumpers and plugs located within each of said remote distribution panels, each further patching jumper and plug forming a further telephone line connection between one junction of said third junction array and one junction of said fourth junction array when the plugs at the ends thereof are in the receptacles of said junctions, respectively, each junctioon in said junction arrays being a receptacle for one of said plugs of said patching jumpers.

2. The intrabuilding telephone system of claim 1 wherein the receptacle at each junction of said first junction array is permanently electrically connected to a distinct telephone line associated with a telephone number assigned by said commercial telephone system.

3. The invention defined in claim 1 wherein said telephone wire line in each patching jumper of said plurality of first patching jumpers is of at least sufficient length such that any one thereof may be connected between the receptacle of any one junction of said first array and the receptacle of any one junction of said second array.

4. The invention defined in claim 1 at least one of said remote distribution panels include a fifth array of junctions and associated receptacles, said fifth array of junctions being constituted by groups of junctions and associated receptacles, and means connecting the receptacles of each of said groups of junctions electrically so that each junction of the group will correspond to the same telephone number, and a further set of patching jumpers having plugs removably connected between the receptacles of one of a selected group of junctions and the receptacles of one of the junctions in said fourth array.

5. A method of rapidly relocating an assigned telephone number within a building structure from one discrete location therein to a second discrete location therein, wherein each said discrete location is provided with a telephone jack, and said building is provided with a central panel having first and second junction arrays, an electrical receptacle at each junction of an array, respectively, with the receptacles at said junctions in said first junction array each permanently connected to a telephone line carrying an assigned number and at least one remote distribution panel assembly having third and fourth junction arrays, an electrical receptacle at each junction in said arrays, respectively, each said receptacle at junctions in said third junction array being permanently electrically connected to junctions in said second junction array, respectively, the receptacles at the junctions of said fourth junction array being permanently electrically connected to telephone jack assemblies at various of said discrete locations in said building, respectively, including said first and said second discrete locations, there being a plurality of patching jumpers, each constituted by a telephone wire line connecting two plugs, each received in a receptacle, the patching jumpers on said central panel extending between the receptacles at said first and second junction arrays, respectively, and the patching jumpers on said remote distribution panel extending between the receptacles said third and said fourth junction arrays, respectively, comprising the steps of physically removing the patching jumper plug from a receptacle at the junction in said fourth array permanently connected to said first discrete location and physically inserting same in the receptacle at said one junction permanently connected to said second discrete location, and disconnecting the telephone hand set from the telephone jack assembly at said one discrete location and removing the entire telephone handset having said assigned number from said one discrete location and connecting same to the jack assembly at said second discrete location.

6. The invention defined in claim 5 wherein said discrete locations are at different floor levels in said building structure including removing the patching jumper plug from the receptacle in one junction in said further junction array permanently connected to said first discrete location and further removing the patching jumper plug from the receptacle of its one junction in said third junction array, removing the patching jumper plug from the receptacle at said one junction in said second junction array permanently connected to the receptacle at said one junction in said third junction array and inserting same in a receptacle at a further junction in said second junction array permanently associated with a further junction in said third junction array, connecting a patching jumper between the receptacle of said further junction in said third junction array with the receptacle at the one junction in said fourth junction array permanently connected to the telephone jack at said second location.

* * * * *